United States Patent
Westbrook et al.

(10) Patent No.: US 7,641,729 B1
(45) Date of Patent: Jan. 5, 2010

(54) DRY CLAY POWDER FOR ASPHALT SEALER AND NOVEL ASPHALT SEALER

(75) Inventors: Claud E. Westbrook, Shanghai (CN); Russell J. Fish, Hardin, KY (US)

(73) Assignee: Unimin Corporation, New Canaan, CT (US)

( * ) Notice: Subject to any disclaimer, the term of this patent is extended or adjusted under 35 U.S.C. 154(b) by 521 days.

(21) Appl. No.: 11/593,669

(22) Filed: Nov. 7, 2006

(51) Int. Cl.
*C08L 95/00* (2006.01)
*C04B 14/10* (2006.01)

(52) U.S. Cl. .................... 106/277; 106/281.1; 106/284; 106/284.01; 106/284.02; 106/486; 106/487; 106/287.17

(58) Field of Classification Search .................. 106/277, 106/281.1, 284, 284.01, 284.02, 287.17, 106/486, 487; 501/141; 423/328.1
See application file for complete search history.

(56) References Cited

U.S. PATENT DOCUMENTS

| | | | |
|---|---|---|---|
| 3,776,748 A * | 12/1973 | Richards ................ 106/284.01 |
| 3,835,117 A | 9/1974 | Walaschek |
| 4,056,401 A * | 11/1977 | DeBough ..................... 106/277 |
| 4,061,502 A | 12/1977 | Windle |
| 4,222,916 A | 9/1980 | Hergenrother |
| 4,544,690 A | 10/1985 | Ladish |
| 4,688,964 A | 8/1987 | Cox |
| 4,812,427 A | 3/1989 | Kohut |
| 4,812,428 A | 3/1989 | Kohut |
| 4,880,759 A | 11/1989 | Kohut |
| 5,153,155 A | 10/1992 | Kohut |
| 6,012,212 A | 1/2000 | Erickson |
| 6,361,591 B1 | 3/2002 | Boyer et al. |
| 6,383,365 B1 | 5/2002 | Boyer et al. |
| 6,979,705 B2 * | 12/2005 | McDowell et al. .......... 106/277 |
| 7,063,739 B2 * | 6/2006 | Poole et al. ................. 106/705 |
| 7,091,148 B2 | 8/2006 | Thomas |
| 7,105,466 B2 * | 9/2006 | Thomas ...................... 501/141 |
| 2002/0160107 A1 | 10/2002 | Amon |
| 2005/0223941 A1 | 10/2005 | Boyer et al. |
| 2005/0266978 A1 | 12/2005 | Thomas |

* cited by examiner

*Primary Examiner*—Helene Klemanski
(74) *Attorney, Agent, or Firm*—Fay Sharpe LLP

(57) ABSTRACT

A ball clay powder having a moisture content of less than 5% and at least about 25% of indigenous silica, said powder comprising a blend of at least two natural ball clays, wherein one of the ball clays is naturally silica rich and has at least about 40% indigenous silica.

11 Claims, 5 Drawing Sheets

OVER 10-20μm (.2-1.5μm)

DRY CLAY POWDER FOR ASPHALT SEALER AND NOVEL ASPHALT SEALER

The present invention relates to the creation of a novel clay product and more particularly to a dry clay powder for use in making asphalt sealers, together with a novel asphalt sealer created by use of the novel dry clay powder.

BACKGROUND OF INVENTION AND INCORPORATION BY REFERENCE

The technology to which the invention is directed relates to a sealer used for asphalt substrates, such as a sealer for asphalt parking lots and driveways of the type employed extensively throughout the United States. Asphalt is comprised essentially of two components, aggregate and a binder. Aggregate for asphalt is a measured mixture of stone and sand, while the binder is a petroleum derivative. These components are combined, heated and blended in a batch plant. As soon as the asphalt is laid in a parking lot or driveway, the binder begins to evaporate and over time it decays by being exposed to the damaging effects of sun that causes oxidation, rain, snow and other environmental conditions. Gasoline, oil leaks and chemicals, such as ice control salt, also have a dramatic effect on the life of the binder in the asphalt. As the binder is destroyed by these external, unavoidable conditions, its ability to hold the aggregate together diminishes. This problem creates cracks, distortion and disintegration of the asphalt surface. After three to five years under normal conditions, major deterioration takes place and the parking lot or driveway must be resurfaced. To protect the asphalt from normal environmental deterioration, a thixotropic sealer is normally applied on top of the asphalt. This is done when the asphalt is first laid and upon subsequent repairs. In either situation, a thin layer of thick sealer is applied to the asphalt surface to protect the same from deterioration. The sealer preserves the elasticity of the asphalt binder by sealing out oxidizing effects of sun, salt and water, as well as petroleum spillage. The sealer or seal coat dries to an attractive uniform flat black layer creating a like new appearance for the asphalt surface. It is common practice to mix sand with the sealer to create a non-skid surface and increase the wear characteristics of the pavement. Generally asphalt sealers constitute a highly economical method of maintaining and extending the life of asphalt surfaces. The most common asphalt sealer is a water based solution of refined coal tar formed as an emulsion with a clay filler and added sand for increasing the wear resistance of the sealer. Clay has a very fine particle or grain size and is an excellent filler in the aqueous emulsion. Other additives are available to enhance specific characteristics of the sealer, such as adhesion characteristics, drying time, sand suspension and color of the sealer.

The present invention relates to a sealer for an asphalt surface, which novel sealer includes coal tar or asphalt pitch emulsified with clay and water. Of course, other additives are included in the novel sealer in accordance with standard technology. Preferably, the new sealer is a coal tar emulsion of coal tar pitch, clay and water, perhaps with an emulsifier or surfactant and other optional ingredients. Such sealers or seal coat are long lasting, have a pleasing black color and are resistant to gasoline and kerosene spills. As an alternative to the preferred coal tar emulsion sealer using the present invention, the sealer can comprise an asphalt based material formed from distilled petroleum fractions. Such heavy hydrocarbon fractions are sometimes used for asphalt based sealers; however, the most common sealer is a coal tar emulsion with a clay filler. Even though invention can be used for both asphalt based and coal tar based sealers, the invention will be described with respect to its use in coal tar emulsion type sealers normally applied to asphalt surfaces, such as parking lots and driveways. The invention specifically involves a novel clay powder to form the filler for an asphalt sealer. Thus, clay products and clay filler for a sealer constitute the general technology of the invention.

Many patents have issued relating to and describing the asphalt sealer technology to which the present invention is particularly directed. Representative patents are Walaschek U.S. Pat. No. 3,835,117; Hergenrother U.S. Pat. No. 4,222,916; Ladish U.S. Pat. No. 4,544,690; and, Boyer U.S. Pat. No. 6,361,591. These patents discuss coal tar emulsion type sealers which constitute the end use for the primary aspect of the present invention and is a secondary aspect of the invention. Thus, these patents are incorporated by reference herein as background information. They describe ultimate use for the primary aspect of the invention. Furthermore, a novel coal tar or asphalt sealer is obtained by employing the primary aspect of the invention. These patents explain the general technology of asphalt sealers.

In these prior art sealer patents and in the asphalt sealer technology in general, processed sand is added to the sealer at the sealer mixing plant. Crushed sand, i.e. fracture silica, combines with the other ingredients to obtain the desired thixotropic nature of the applied sealer. Sand added to the sealer, even though ground, has a relatively large particle size since the cost of reducing the grain size of sand is quite high. Furthermore, the emulsion with clay filler must be made viscous enough to maintain in suspension these large sand particles added to the sealer at the sealer mixing plant. This may not be the optical thixotropic characteristic for applying the sealer or for rapid setting of the sealer. As explained in the prior art incorporated by reference herein, the added sand does, indeed increase the wear characteristics of the sealer and also the coefficient of friction to prevent slippery outer surface for the sealer as it sets. For these and other properties, the added sand in the sealer is believed to be essential to create the desired mechanical and rheological characteristics of the sealer as it is applied and ultimately set for long time use.

In summary, the second aspect of the present invention is a novel asphalt sealer of the type utilizing coal tar or asphalt emulsion with a clay filler and silica or sand for creating the desired characteristics set forth in the many patents directed to this type emulsion sealer.

The primary aspect of the invention relates to a novel clay product for shipment to a mixing plant to make the novel sealer. With respect to the novel clay product, there is substantial background technology regarding processing of natural clays into commercial products. The preferred clay used in the present invention is ball clay composed mainly of mineral kaolinite. It is somewhat different than kaolin because of the other minerals in ball clay. Ball clay has a finer grain size and is a very plastic, refractory bond clay. Most ball clays contain a minor amount of organic material and clay mineral montmorillonite. The fineness of the ball clay, together with the added materials give ball clays excellent elasticity and strength. Commercial deposits of ball clays are located in western Kentucky, western Tennessee, northern Mississippi and northeastern Texas. They include Kaolinite, Illite and Smectite with indigenous silica. The use of fine clay in asphalt sealers allows excellent emulsification of the coal tar or asphalt pitch. The fine grain stabilizer of the aqueous emulsion. The present invention relates to a processed ball clay product, specifically developed for use in coal tar emulsions for asphalt sealers. Ball clay is the subject of many prior art patents such as Windle U.S. Pat. No. 4,061,502. This patent teaches a method of using a wet process to purify ball clay. Processing ball clays and, indeed, other clays using complex slurry technology is well known for use in slip casting. A summary of this slurry processing technology is found in Kohut U.S. Pat. No. 5,153,155. In both the Windle patent and the Kohut patent, the starting clay has substantially less than 10% free "SiO2" particles. The Windle and Kohut patents are incorporated by reference to show certain background technologies for wet processing ball clays by a method not material to the processing technique of the present invention. In Kohut U.S. Pat. No. 4,812,427, Kohut U.S. Pat. No. 4,812,428 and Kohut U.S. Pat. No. 4,880,759 there are described a clay slurry process. Such clay slurry type processing is described in Thomas U.S. Pat. No. 7,091,148, which involves a slurry developed specifically for slip casting. A continuation-in-part application of the Thomas patent is disclosed in Pub. No. U.S. 2005/0266978. These two patents items by Thomas are also incorporated by reference herein as illustrating a wet slurry technology, such as described in the two earlier Kohut patents; The wet process involves screening to regulate large or over-sized grain size. The present invention does not relate to a clay material having large particles, nor is it a clay product formed for slip casting. Thus, these patents incorporated by reference herein are mere background information on clay processing. They are relevant as support for the advancement obtained by the present invention which involves a ball clay material developed specifically for an aqueous emulsion type sealer for asphalt surfaces. Its characteristics are tailored to a use not similar to slip casting. In view of this background technology and incorporated prior art patents, it is clear that they do not teach or suggest the invention or inventions defined in the appended claims.

PROBLEMS NOT SOLVED

The relevant background technology of the present invention shows no solution to the major problems associated with emulsion type sealers employing a clay filler. For many years, the paving industry employed an asphalt sealer where clay is emulsified with coal tar. Ground sand was then added to the emulsion after the sand was crushed to the desired particle size. This processed sand was added to the emulsion for the purposes well described in the prior art. However, the particle size of the sand was not as fine as the silica indigenous to natural ball clay. Furthermore, the sealer industry anticipates governmental regulations regarding the handling of processed or fractured silica at the emulsion mixing plant. The cost of grinding the sand was high, but the particles were not ground to the size of clay particles which are as low as 1.5 microns or less. Thus, the problem to which the present invention was directed involves the need for introducing silica to the coal tar or asphalt pitch emulsion without the disadvantage of grinding sand or handling the sand at the mixing facility preparing the asphalt sealer.

THE PRESENT INVENTION

The problems associated with grinding sand and applying it at the mixing facility making the sealer have been overcome by the present invention which relates to a new sand composition and a new sealer using such composition.

To solve the problems associated with producing asphalt sealer having SiO2 added as a separate component, the present invention relates to the production of a dry powdered ball clay blend having a mean particle size less than about 1.0 to 1.5 microns. The fine dry powder is then shipped to the facility for mixing the asphalt sealer to form coal tar emulsion with the powdered clay. The fine powdered clay is novel in that it is dry and has a high percentage of indigenous silica, but no additives such as dispersants. This novel dry powder is packaged and then shipped to the site for producing an asphalt sealer. In this manner, the production of the sealer does not involve grinding of sand into small particles and then adding the sand as a separate component to the sealer at the mixing facility. This overcomes the problems associated with the addition of finely ground sand into a sealer at the mixing facility. The fine grain size of the novel powder gives improved stability to the emulsion. There is no need for employing a screening operation in the clay producing process, nor is it necessary to ship a large volume of water from the clay processor to the sealer mixing facility. The new process starts with a fine kaolinite clay, preferably ball clay, so fine particles are natural in the end product. Thus, the invention involves a novel powdered clay. The invention also involves a novel asphalt sealer which does not need addition of ground silica at the mixing facility. It has been found that the naturally aged silica associated with a fine grained ball clay can give excellent silica properties in the sealer. The novel clay powder using this concept has enhanced thixotropic and rheological characteristics. The fine powdered silica in the novel dry powder does not adversely interfere with the mechanical and hydraulic characteristics of the resulting coal tar emulsion.

The clay used to produce the novel clay powder is preferably a ball clay blend that incorporates the equivalent silica content that is normally added separately during the mixing of coal tar sealer. The natural silica from the selected ball clay is equivalent to the amount of silica needed by the sealer formulation. The dry ball clay powder of the invention forms a sealer that is better than existing sealers with respect to abrasion resistance and rheological performance. The use of a fine grain clay having natural aged silica produces powder to give the sealer its necessary free silica content, while enhancing the quality of the coal tar/clay emulsion.

By using the present invention, the coal tar emulsion with clay filler includes naturally aged silica so that separate addition of sand is not necessary for producing a wear resistant sealer.

The powdered clay of the invention involves a formulation including a standard ball clay blend having about 22-23% silica with a natural ball clay having over 50% indigenous silica. This produced a ball clay powder equivalent to 1550 pounds of standard ball clay and 100 pounds of added ground silica. Bags filled with the new dry clay blend are shipped to the mixing facility making the sealer and is merely added to the emulsion without need for processed silica.

In accordance with the present invention there is provided a ball clay powder having a moisture content of less than 5% and at least about 25% of indigenous silica. This powder comprises a blend of at least two naturally occurring ball clays wherein one of the ball clays is naturally silica rich and has at least about 40% indigenous silica. In accordance with another aspect of the invention the ball clay powder is substantially free of fractured silica.

In accordance with another aspect of the present invention, the naturally silica rich ball clay is about 10-20% of the blend; however, it can be up to about 50% for accomplishing the novel end result. The other ball clays of the blend used in forming the novel clay powder each have a typical indigenous silica content, which is up to about 30%, but preferably about 20% silica. The blend can also include clays with very low indigenous silica, such as kaolin. As is known, the indigenous or naturally aged silica has no fracture stress introduced into the crystalline structure from external grinding and/or crushing forces. Preferably, the naturally silica rich ball clay has at least about 50% indigenous silica. More than two ball clays are normally used in the blend to produce the powder of the present invention. Indeed, a kaolin clay can be used, but is not preferred.

The indigenous silica in the ball clay powder has a natural particle size distribution wherein the average size of all of the particles is substantially less than about 1.5 microns. Indeed, the accumulative mass of the dry powder is 50-75% finer than 1.0 micron. This small size of the ball clay and, thus, the included naturally aged silica, drastically enhances the emulsification process of the resulting asphalt sealer. The natural grain size distribution of the silica particles throughout the emulsion of the sealer enhances the wear characteristics, as well as the coefficient of friction of the resulting sealer after it sets. The powder (clay/silica) provides an excellent emulsion. Processed sand can not be reduced to such small size, nor can it produce a uniform distribution curve for the particle sizes. Use of ground sand requires screening as used to provide the grain size in Thomas U.S. Pat. No. 7,091,148 (FIG. 1). The aged silica particles in the novel ball clay powder substantially enhances the contribution of the silica to the mechanical and thixotropic characteristics of the resulting sealer because of its broad particle size distribution. Furthermore, it has been found that the practice of grinding the silica, as it is now done before adding it into the sealer, decreases the structural integrity of the sand grains, limits the range of the particle size distribution and exposes the applicable work force to crystalline silica dust, a possible government regulation issue. Use of ball clay or other fine grain clay with a high level of indigenous silica enhances the mixing procedure.

Although the primary aspect of the present invention is the production of a dry ball clay powder for shipment to the facility making an asphalt sealer, the novel powder results in the production of a novel coal tar emulsion used as a sealer. This emulsion includes an emulsion of coal tar and finely divided, essentially dry ball clay powder. The dry ball clay powder is a blend of at least two natural ball clays having indigenous silica content of least 20% and a natural particle size distribution for the naturally aged silica. The emulsion has no added processed silica. The dry coal tar powder of the present invention may be added in the emulsion with added water or can be mixed with water before being added into the emulsion with or without more water. Thus, the amount and timing of water introduction into the emulsion is adjustable by using the novel dry clay powder. Coal tar and finely divided essentially dry powder are combined at the facility to make a sealer.

Although the invention involves a coal tar emulsion, the novel dry ball clay powder can also be used in the alternative type sealer of the type employing an asphalt pitch, as opposed to coal tar. In the broadest aspect, the asphalt sealer involves the introduction of the clay and silica as a composite dry powder with a mean particle size less than about 1.0 to 1.5 microns. This powder includes a blend of at least two naturally occurring ball clays with an indigenous silica content of over 20% wherein at least one of the ball clays has an indigenous silica content of over 40-50%. The asphalt sealer, as defined herein, is essentially free from added processed silica and is also novel.

The novel asphalt sealer is the type containing coal tar or asphalt pitch with clay and silica. This sealer has a preselected percentage of water, wherein the clay and silica are introduced as a composite fine dry powder including a blend of at least two naturally occurring ball clays, wherein the indigenous silica content of the clay blend is at least 20%. A vast majority of the water in the sealer is introduced at the mixer. Consequently, the dry powder is shipped to the mixing facility and then combined with water, either in the emulsifier or preparatory to adding the fine ball clay powder into the emulsifier. Thus, the water is added when required as is the clay powder itself. The silica is carried with the clay powder. The powder does not contain additives such as dispersants which are not wanted in the sealer.

In either a coal tar emulsion or asphalt pitch emulsion, the silica introduced by the dry powder is in the general range of 100 pounds of indigenous silica to each 1200-2000 pounds of powder. It has been found that the invention, although not preferred, can be used with naturally occurring high kalonite clays, such as kaolin, blended with ball clay or clays. This produces a clay powder formed from a blend of at least two high kaolinite clays wherein one of the clays is a naturally silica rich ball clay that has at least about 40% indigenous silica. The indigenous rich clay is normally ball clay. This is a slight modification of the preferred embodiment which involves mostly, if not all, ball clays.

The primary object of the present invention is to provide a clay powder as defined in the appended claims of this disclosure.

Another object of the present invention is the provision of a coal tar emulsion having no added processed silica, but with a high content of silica particles in the form of indigenous silica particles.

Yet another object of the present invention is the provision of a compound to be used in an emulsion type asphalt sealer, which compound can be shipped to the sealer facility without the weight of unnecessary water or unwanted additives while providing indigenous silica so that there is no need to add processed silica in the sealer mixing procedure.

Another object of the present invention is the provision of a coal tar sealer for an asphalt surface, which sealer is free of added processed silica and wherein the necessary silica is natural, has a natural particle size distribution and no sharp or fractured surfaces.

Still a further object of the present invention is the provision of an asphalt sealer, as defined above, which sealer is a coal tar and clay emulsion with silica that is formed to give the desired thixotropic characteristics and wherein the suspended silica particles do not tend to settle, but do increase the wear resistance and other necessary properties of the sealer.

Another object of the invention is the provision of a dry clay powder with a fine particle size and a high level of indigenous silica. The powder is a blend of clays which are mostly, if not all, ball clays.

Yet another object of the present invention is the provision of a sealer, as defined above, which sealer utilizes ball clay powder with high indigenous silica for enhancing the rheological properties of the sealer.

These and other objects and advantages will become apparent from the following description taken together with the accompanying drawings.

PREFERRED EMBODIMENT

Figure 1:
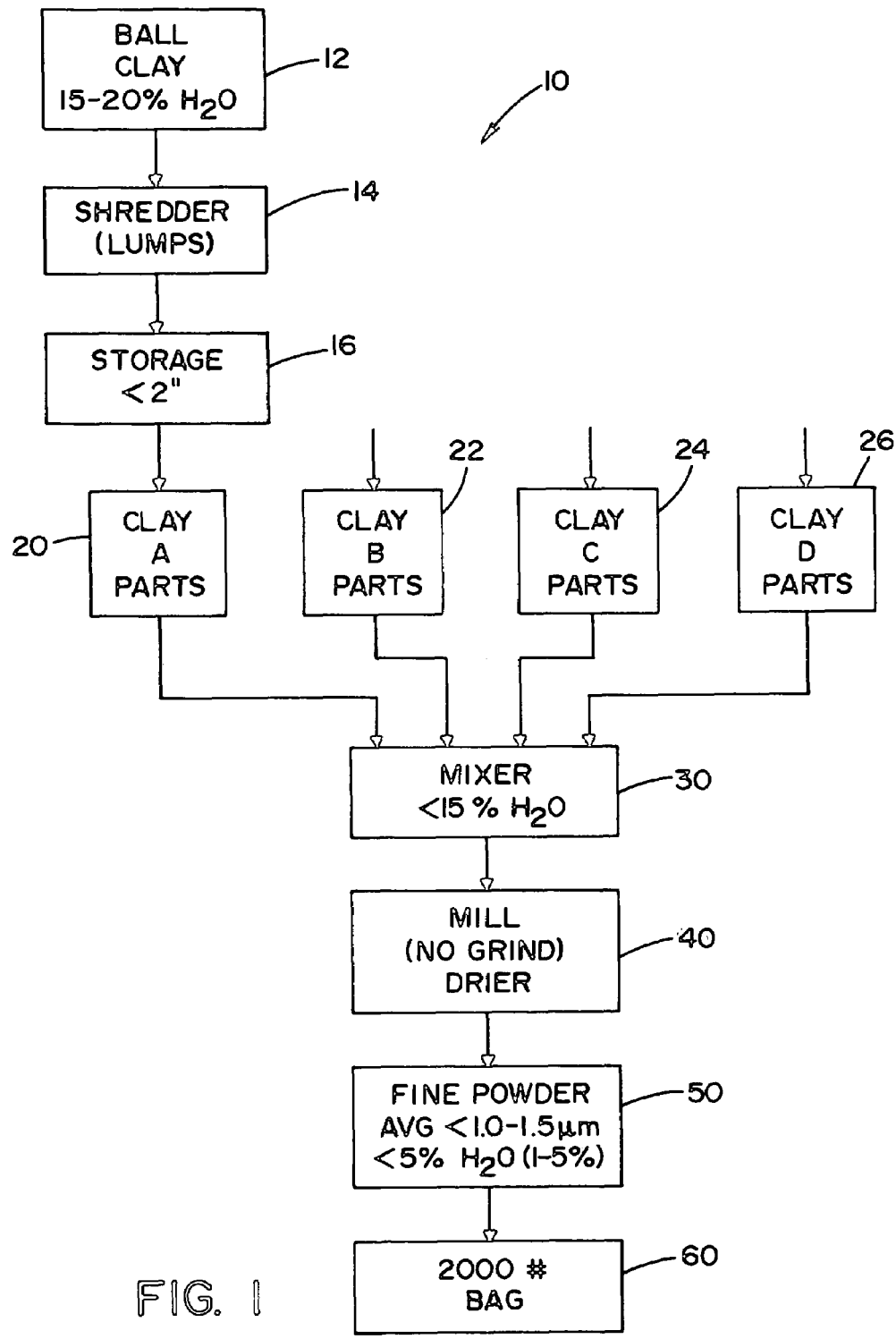
FIG. 1 is a block diagram showing a flow chart of the process used in producing the dry clay powder in accordance with the preferred embodiment of the invention.

Referring now to the drawings, wherein the drawings are for the purpose of illustrating the preferred embodiment of the present invention and not for the purpose of limiting same, FIG. 1 shows the method of producing the novel dry clay powder constituting the preferred embodiment of the invention. Preparatory to the discussion of method 10, the introductory portion and appended claims of this application are incorporated by reference herein to describe the preferred embodiment so that there is an understanding of the contribution made by the present invention. In method 10, naturally mined ball clay is transmitted to the facility from the quarry location. The method involved processing steps using a plurality of separate ball clays. Only one clay introduction step is shown as block 12 and is identified as clay A. In the preferred embodiment of the present invention four ball clays are employed to produce the desired ball clay powder. These ball clays are labeled Clay B, Clay C and Clay D. They are described in the following table and have the disclosed percentage of indigenous silica. This is the critical property of the clays used in the invention.

TABLE I

| Parts | % | Ball Clay | Silica |
|---|---|---|---|
| 2 | 28.6% | Clay A | 22-23% |
| 2 | 28.6% | Clay B | 22-23% |
| 2 | 28.6% | Clay C | 22-23% |
| 1 | 14.3%* | Clay D | 56.1%** |
| 7 | 100% | Powder Blend (less than 2-5% H$_2$O) | 27.6%*** |

10-20% preferred, but up to about 50%
**40-60%
***Over 20% preferred 25-30%

Ball clay A, ball clay B and ball clay C are each incorporated as two parts of the total blend processed by method 10. As indicated in Table I, there is 28.6% of each of these three naturally occurring ball clays used in the method. These ball clays each include a quartz or indigenous silica content of 22-23% in their natural form. The silica has a small particle size less than about 1.5 micron and is naturally aged and has a smooth particle configuration schematically illustrated in FIG. 3B. In the past, one of the ball clays with about 22% indigenous silica was used for three parts of the blend. A silica rich clay, such as clay D was not used. This produced a ball clay blend having 65.0% Kaolinite, 6.1% Illite, 3.7% Smectite and 2.2% other. Thus, performing method 10 using two parts clay A, two parts clay B and three parts clay C resulted in a dry powder having only 23% indigenous silica. With this amount of indigenous silica, it was still necessary to add sand to a sealer at the mixing facility to make a sealer in accordance with the method shown in FIG. 7. Using dry powder improved the emulsion process, but still required added sand. This test run of dry powder evidenced a need for a dry powder reaching a target indigenous silica of 25-30% and preferably 27.5% indigenous silica in the dry powder. In accordance with the invention this silica target was obtained by replacing one part of the clay C by one part of a high silica ball clay, clay D. Clay D is a natural bulk clay with indigenous silica of 56.1%. By replacing one part of the ball clay C with one part of silica rich ball clay D, as set forth in TABLE I, the final dry powder had 27.6% indigenous silica. This was an increase of over 5% and resulted in a dry powder that was about equivalent to the previously defined powder with 100 pounds of added silica at the sealer mixing site for each 1550 pounds of the blended powder. Use of silica rich clay D reached the target of 27.5% indigenous silica in the dry clay powder. Thus, the invention involves use of four separate ball clays wherein one of the ball clays is silica rich and has 40-60% indigenous silica. The resulting blend has over 20% and preferably 15-30% indigenous silica. To accomplish this composition, the silica rich ball clay D or any other ball clay having over 40% indigenous silica was included in an amount of about 10-20% by weight of the total blend. When modifying the parts of ball clays shown in TABLE I, the target for indigenous silica was 27.5%. This target was reached by substituting one part silica rich clay D for one part of typical ball clay C. In a preferred embodiment of the examples discussed herein, clay A is Mississippi ball clay, clay B is RBS ball clay, clay C is Medium Brasfield ball clay and clay D is Campbell B ball clay. Of course, other clays could be used.

Turning now to method 10 for processing Clay A, Clay B, Clay C and Clay D, each of the four ball clays is shredded as indicated by block 14 into dry lumps. Each of the four incoming ball clays from the remote shredding locations has a low water content generally in the range of 15-20%. After the ball clays are then shredded into relatively small lumps, as indicated by step or block 14, these lumps for all clays are stored as indicated by step or block 16. The process including steps or blocks 12, 14 and 16 are not repeated for the individual ball clays disclosed in TABLE I. The lumps of stored ball clay as indicated by steps or blocks 20, 22, 24 and 26 are then metered into common mixer 30, which mixes the dry ball clay blend in accordance with standard clay processing technology. The mixed ball clay blend then has a reduced water content of substantially less than 15% water. This homogeneous mixed blend of four ball clays is then directed to a milling operation which also includes an inherent drying function. The mill is an air swept hammer mill that physically converts the clay blend into a dry clay powder. The mill does not produce any grinding action, but merely reduces the particles into a fine powder in accordance with standard practice. The milling operation in block 40 is performed over time, after which the dried blended ball clay is directed to the deagglomerator step 50. This step reduces the moisture content of the fine powder and creates powders having a mean particle size less than about 1.0-1.5 microns. Preferably, the particles have an accumulative mass of dry powder that is 50-75% finer than 1.0 micron. The moisture content is drastically reduced to less than 5% and preferably about 1.5%. The dry fine powder is then directed to process step 60 where the fine dry powder is bagged into 2000 pound bags for shipment. The end product is described in TABLE II.

TABLE II

| Product | Quartz | Kaolinite | Illite | Smectite | Other |
|---|---|---|---|---|---|
| Blend (4) | 27.6 | 60.0 | 7.2 | 3.2 | 2.1 |
| Clay D | 56.1 | 28.7 | 13.8 | 0 | 1.4 |

The resulting powder including four blended ball clays, i.e. Blend (4), has a quartz or indigenous silica percentage by weight of 27.6 with a kaolinite percentage of 60%. This composition of a representative embodiment of the invention is obtained by adding ball clay D with about 56% indigenous silica as one clay in method 10. The amount of indigenous silica is greatly higher than the kaolinite in ball clay D. The silica in ball clays A, B and C is less than the kaolinite. The bagged powder is then shipped to a remote mixing location as a dry powder weighing 2000 pounds per bag.

Figure 3A:
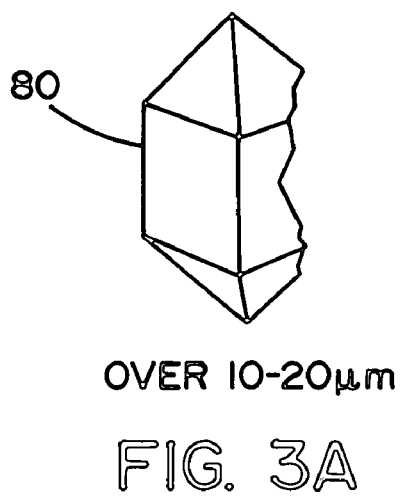
FIG. 3A is a schematic illustration of a fractured silica product as produced by grinding sand for inclusion in the prior art asphalt sealer.
Figure 3B:
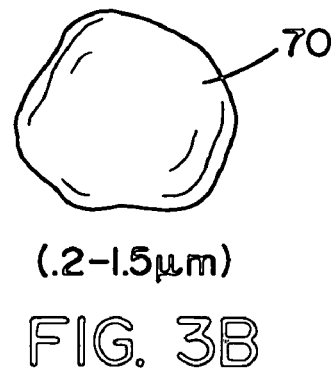
FIG. 3B is a schematic representation of an aged silica particle of the type found in naturally occurring ball clay.

The silica particles within the finely divided powder is naturally aged silica as shown schematically in FIG. 3B. It has a broad particle distribution. More importantly, the particles of silica in the blended powder is not fractured silica. Such broken crystals are schematically illustrated in FIG. 3A as fractured particle 80. The crystals of sand are fractured when processing large sand and into small particles. The cost of reducing the size of fractured sand particle 80 drastically increases as the size of the particle decrease. By using the dry powder of the present invention naturally aged silica, represented as particles 70, are introduced into the sealer. The particles have a broad grain size distribution. No processed silica is needed in the sealer formed by using a fine powder produced in accordance with method 10.

Figure 4:
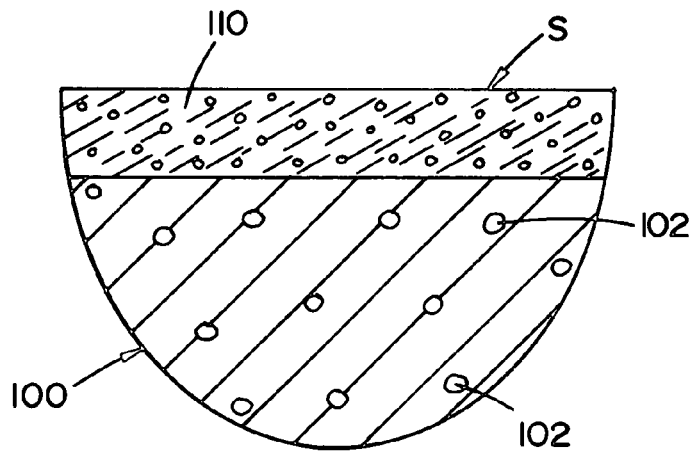
FIG. 4 is a partial view in cross section of an asphalt layer covered with a coal tar emulsion sealer produced in accordance with the present invention.
Figure 5:
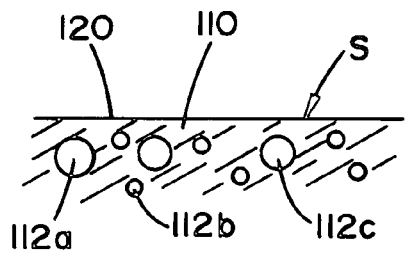
FIG. 5 is an enlarged small partial view of the sealer shown in FIG. 4 illustrating a surface area of the sealer.
Figure 6:
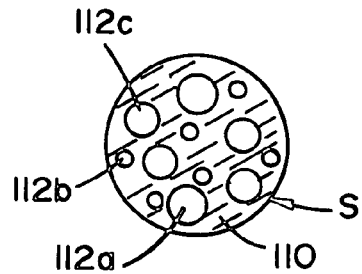
FIG. 6 is an enlarged partial view of the body of the sealer shown in FIG. 4; and, FIG. 7 is a block diagram of a flow chart illustrating the method used by a mixing facility for making an asphalt sealer when provided with dry powder produced in accordance with the method illustrated in FIG. 1.

Finely divided powder with a mean particle size less than about 1.0 micron is then used in an asphalt sealer to produce structures schematically illustrated in FIGS. 4, 5 and 6. In FIG. 4, asphalt substrate 100 has a given height and includes stone and other aggregate 102. On top of the asphalt there is sealer S, including an emulsion 110 formed of coal tar and extremely finely divided clay with small silica particles 112a, 112b, 112c. These particles have a shape generally shown in FIG. 3B and a broad grain size distribution. Top surface 120, as shown in FIG. 5, is protected by particles having different sizes to produce good wear resistance and good thixotropic characteristics for spreading sealer S over asphalt substrate 100. The particles increase the friction and wear characteristics of surface 120 in accordance with standard technology. FIG. 6 shows a coal tar/clay emulsion 110 using the novel fine clay particles with silica particles 112a, 112b, 112c in different sizes. Consequently, FIGS. 4-6 schematically illustrate sealer S utilizing the powders produced by method 10 of FIG. 1. It has been found that the small indigenous silica particles from the various naturally occurring ball clays satisfy the physical, thixotropical and rheological properties necessary for the asphalt sealer and avoids the need for added sand.

As an alternative embodiment, it has been found that some of the ball clays used in the preferred embodiment of TABLE I could be replaced by kaoline clay with a low percentage of indigenous silica. The preferred example described in Table I has been modified by the example set forth in Table III.

TABLE III

| Parts | Clay | Silica |
|---|---|---|
| 1 | E | 2% |
| 2 | A | 22% |
| 3 | B | 22% |
| 1 | D | 60% |
|  | Blend | 25% |

In this example, clay E is kaolin with a low indigenous silica. It is blended with ball clays A and B, so the silica rich ball clay D raises the level of indigenous silica to an acceptable value generally about 25% in the powder mode by method 10. In a further example the added silica rich ball clay needed to raise the level of the dry powder to the target range of 25-30%, may be as high as 50% of the total blend. This is the situation of the next example wherein the silica rich ball clay has only 40% indigenous silica. To obtain the target range, 50% of silica rich ball clay is employed as shown in Table IV.

TABLE IV

| Parts | Clay | Silica |
|---|---|---|
| 2 | E | 2% |
| 2 | A | 22% |
| 3 | F | 40% |
|  | Blend | 27% |

The examples of blends shown in Tables III and IV describe how the amount of silica rich ball clay is used according to its percentage of indigenous silica and the type of other clays used with the silica rich ball clay in the total blend. The amount of silica rich ball clay needed to obtain an indigenous silica level for a sealer is determined by a compounding process shown as method 150 in FIG. 2.

Figure 2:
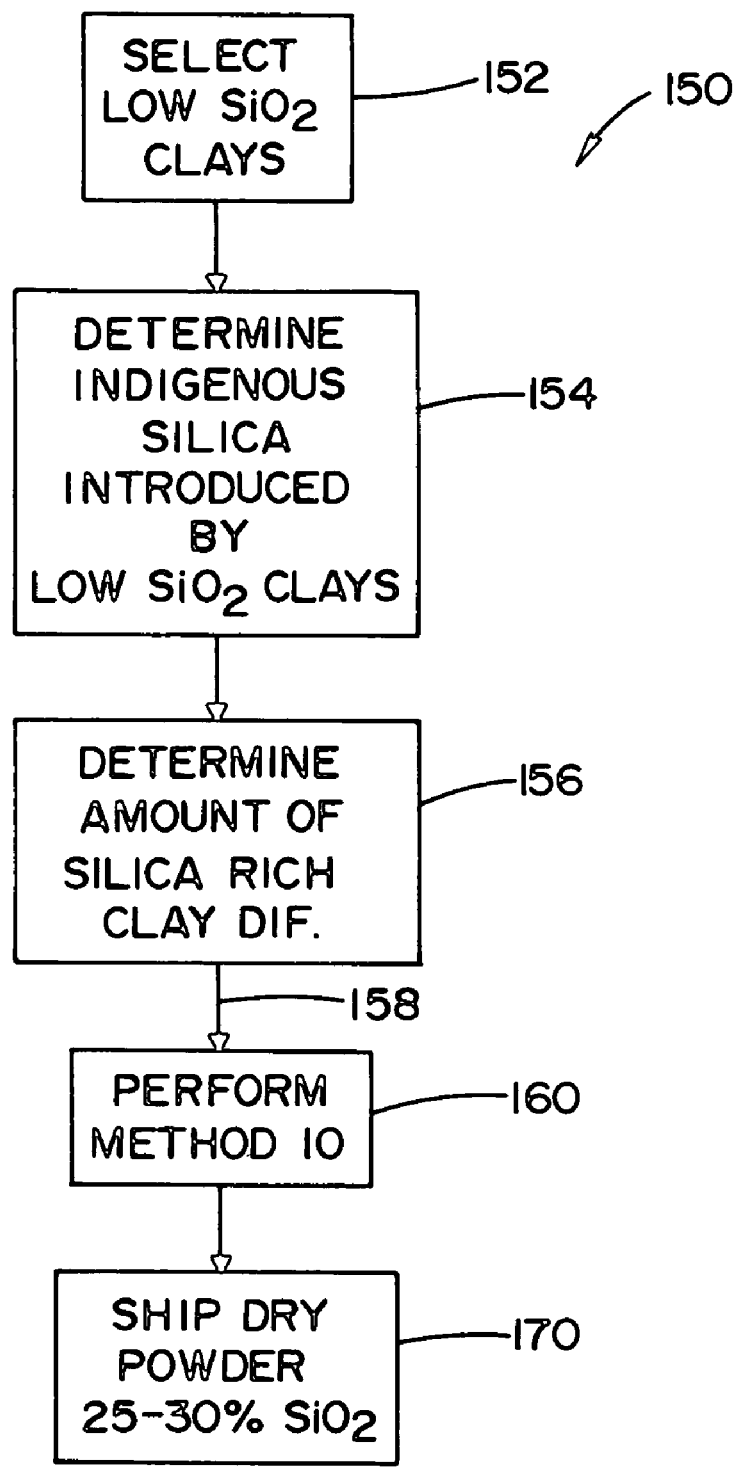
FIG. 2 is a block diagram showing a flow chart for the method of selecting clay to be processed by the method of FIG. 1.

To determine the amount of silica rich ball clay for use with other clays in method 10 of FIG. 1, it is first necessary to identify the selected low silica level clay as shown in Tables I, III and IV. This selection procedure is illustrated as operation or step 152 of compounding method 150. After determining the amount of indigenous silica introduced by the selected low silica clays by step 154 and knowing the percentage of indigenous silica in the silica rich ball clay, i.e. clay D or clay F, the required amount of silica rich ball clay is then calculated as indicated by step 156 of method 150. After step 156, the clays and their amounts are known. They are then introduced into operation or step 12 of method 10. This operation is represented by step 160 receiving the clays as represented by line 158 forming the outcome of method 150. The dry powder produced by method 10 is then shipped as indicated by operation 170 in FIG. 2. FIG. 2 and Tables III and IV are illustrated to describe the many variations for using a silica rich ball clay to make a dry clay powder that avoids the necessity of adding sand to an asphalt sealer.

Figure 7:
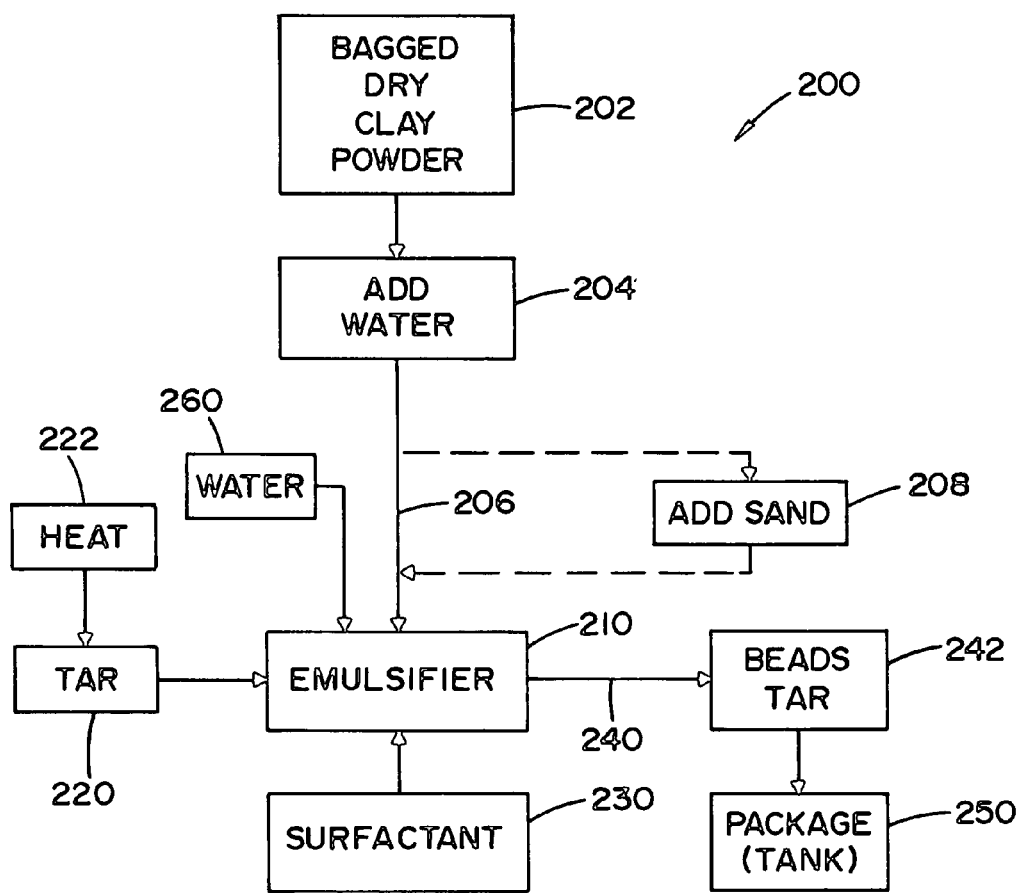

After the dry clay powder is packaged and shipped to a mixing facility, it is processed by a method schematically illustrated as method 200 in FIG. 7. The 2000 pound bags of dry clay powder are emptied into hopper 202. Then water may be added to provide a mixture with sufficient low viscosity for transporting. This possible addition of transport water is shown in step or block 204. The water suspension of the dry powder is directed by line 206 to emulsifier 210 that receives coal tar from supply 220 which is heated by heater 222 in accordance with standard practice. Thus, the mixture from block 204 and coal tar from supply 220 is directed into emulsifier 210 for the purposes of forming emulsion 110. In the past, the conveyor line 206 to emulsifier included step 208 involving the addition of ground sand. Since coal tar is hydrophobic, a surfactant from supply 230 is added to emulsifier 210 to produce coal tar beads 242 issuing from exit 240 into container 250. The coal tar beads are now ready to be used as sealer S shown in FIGS. 4-6. The dry clay powder may be introduced directly into the emulsifier. Water necessary for forming an emulsion is provided by supply 260. In this manner, the optimum amount of water for the emulsion is introduced at the preferred mixing stage. Indeed, water from supply 260 is normally necessary even with the formation of a water mixture with the dry powder at step 204.

The invention involves processing clay to create a novel powder that is dry and formed of blended ball clay with indigenous silica particles amounting to 25-30% by weight. In accordance with another aspect of the invention, a sealer is formed from the novel dry clay powder. The sealer is essentially free of processed or fractured silica.

Having thus defined the invention, the following is claimed:

1. A settable emulsion for use as a sealer to cover the exposed surface of an asphalt substructure, said emulsion containing coal tar or asphalt pitch, clay, free silica for surface enhancement and a preselected percentage of water, said emulsion being essentially free of processed silica, wherein said clay and silica particles are introduced as a composite substantially dry powder including a blend of at least two naturally occurring ball clays with the indigenous silica particle content of one of the clays being over 40% by weight of said clay and wherein the majority of the water of said emulsion is introduced separately from said dry powder.

2. An emulsion as defined in claim 1 wherein said indigenous silica particle content of the blend is over 25% by weight of said blend.

3. A composite substantially dry powder for use in a settable emulsion to cover the surface of an asphalt substructure, said powder having at least 25% by weight of indigenous silica particles, said dry powder comprising a blend of at least two natural ball clays selected to control the physical properties of said emulsion and at least one naturally silica rich ball clay that has at least about 40% by weight indigenous silica particles to provide the desired amount of silica particles in said emulsion.

4. A composite dry powder as defined in claim 3 wherein said naturally silica rich clay is about 10-50% by weight of said blend.

5. A composite dry powder as defined in claim 3 wherein said naturally silica rich clay has at least 50% by weight of indigenous silica particles.

6. A composite substantially dry powder as defined in claim 3 wherein at least one of said clays is a kaolin clay.

7. A composite substantially dry powder as defined in claim 3 wherein said particles are naturally aged to have a natural particle size distribution.

8. A composite substantially dry powder as defined in claim 7 wherein said mean particle size is less than 1.5 microns.

9. A composite substantially dry powder as defined in claim 3 wherein said powder has about 25-30% by weight of indigenous silica particles.

10. A composite substantially dry powder as defined in claim 3 wherein the amount of indigenous silica particles in said powder is in the general range of 100 pounds of indigenous silica particles to each 1200-2000 pounds of natural clay.

11. A composite substantially dry powder as defined in claim 3 wherein said powder has a moisture content of less than 5% by weight of said powder.

* * * * *